Jan. 26, 1937. W. F. DAVIS Re. 20,251

ENGINE COOLING DEVICE

Original Filed Dec. 18, 1931

INVENTOR
Walter F. Davis
BY
Hoguet & Neary
ATTORNEYS

Reissued Jan. 26, 1937

Re. 20,251

UNITED STATES PATENT OFFICE 20,251

ENGINE COOLING DEVICE

Walter F. Davis, Farmingdale, N. Y., assignor, by mesne assignments, to Ranger Engineering Corporation, Farmingdale, Long Island, N. Y., a corporation of Delaware Original No. 2,005,336, dated June 18, 1935, Serial No. 581,851, December 18, 1931. Application for reissue January 29, 1936, Serial No. 61,360

12 Claims. (Cl. 123—171)

This invention relates to air cooling systems for internal combustion engines and has for an object to provide a simple and efficient means to control the passage of air around the engine cylinders for cooling purposes.

It is another object to provide such a means which is also easily attached and detached.

It is a further object to provide a baffle which will also cooperate, by reason of its design and place of attachment, with air-collecting engine cowling, positioned on one side of the cylinders, and the cylinder cooling fins to provide restricted passages adjacent the cylinder walls for the flow of air under differential pressure from within the cowling to the other side of the cylinders, the baffle being so shaped as to provide a Venturi effect and insure accelerated flow of air after it has passed through the restricted passage between and in thorough contact with the outer walls of the cylinders.

With the foregoing and other objects in view, the invention consists in the combination of parts and in the details of construction hereinafter set forth in the following description and appended claims, certain embodiments thereof being illustrated in the accompanying drawing, in which:

Figure 1:
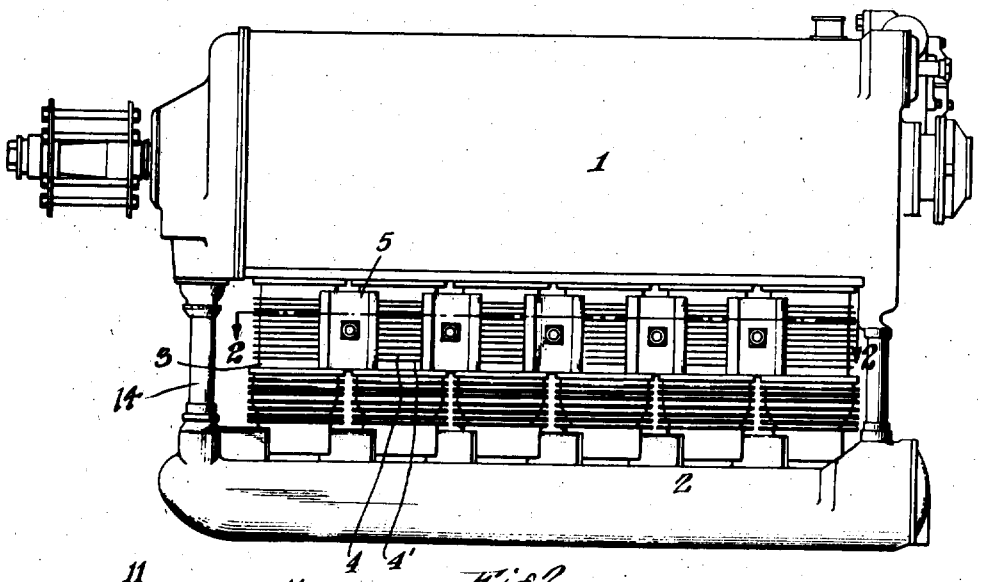
Figure 1 is a view in side elevation of an inverted internal combustion engine showing the cylinders, their cooling fins and baffles.

Referring more particularly to the drawing, the particular engine shown in Figure 1 for purposes of illustration is a six cylinder inverted and in line aeronautical engine, the crankcase being indicated at 1, the camshaft housing at 2 and the cylinders extending therebetween. The cylinders are cast separately and arranged in line and are spaced from each other and are provided with suitable cooling fins cast thereon. Figure 1 shows five cooling baffles, one being placed between each cylinder and the cylinder adjacent.

Figure 2:
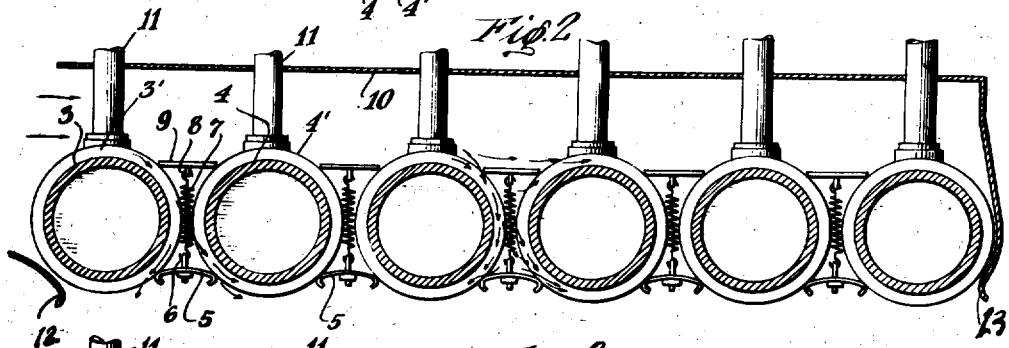
Figure 2 is a view in longitudinal cross-section along line 2—2 of Figure 1 taken through the cylinders, the baffles and the engine cowling, showing the cowling on the exhaust side and the baffles on the intake side of the cylinders.

Referring to Figure 2, a baffle 5 of light metal having a curved back and inwardly curved ends A and B is placed so as to rest upon the lateral cooling fins 3′ and 4′ of cylinders 3 and 4 so as to overlap the space therebetween. These baffles 5 may be employed in conjunction with cylinder head baffles, such as those disclosed in my copending application for Engine cooling system, Serial No. 581,852, filed December 18, 1931, now Patent No. 2,037,708. This baffle 5 is retained in this position by means of a hook 6 attached thereto for engagement by a tension spring 7 which engages a hook 8 on a narrow plate 9 which may fit between two lateral fins of the cylinders 3 and 4, the fins tending to keep the plate in position and the tension of the spring tending to keep the baffle in position. The arrangement of the other baffles is similar throughout the engine.

In the arrangement shown in Figure 2, the baffles 5 are all arranged on the intake side of the engine, the exhaust pipes being shown at 11 adjacent the exhaust ports, the intake ports (not shown) being substantially at the opposite side of the cylinder from the exhaust ports and pipes. It will be appreciated that any suitable type of engine cowling, such as that represented at 10, may be employed to properly collect and trap the incoming air as it flows in the direction indicated by the arrows. In this instance, the cowling 10 is arranged on the exhaust side opposite the baffles. The high velocity incoming air, being confined by the cowling 10 and the baffles 5, builds up considerable pressure and the air is forced against the exhaust side of the cylinder walls and flows under pressure through the relatively small passages formed between the plates and baffles and the corresponding cylinder walls to the opposite or low pressure side. However, the path of least resistance for the air is to flow in a straight line and therefore it may be advisable to provide some induction system for the air in order to insure an accelerated discharge of the air as it emerges between the adjacent cylinder walls. This is accomplished by the baffles which, due to their curved backs and inwardly curved ends, produce an air passageway of such a nature between the baffle resting on the lateral cooling fins and the actual cylinder wall that a Venturi effect is obtained. This Venturi effect in causing an accelerated air flow at this point has been found to be an efficient system for cooperating with the built up air pressure in the cowling to insure the air cooling of the adjacent cylinder walls.

Figure 3:
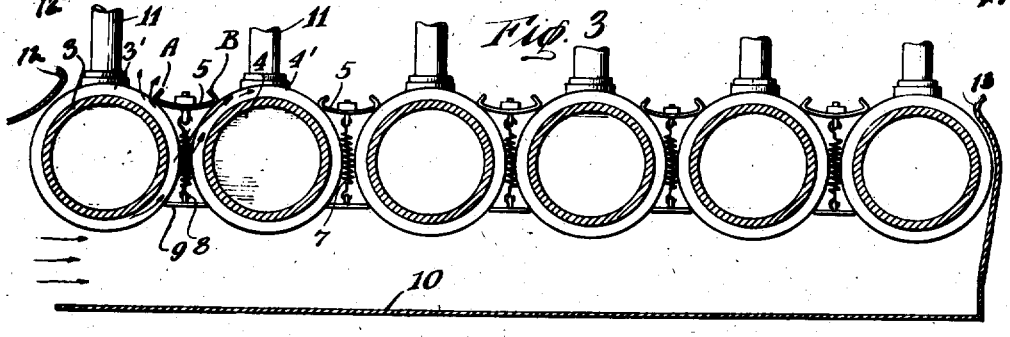
Figure 3 is a similar view with the baffles arranged on the exhaust side and the cowling on the intake side of the cylinders.

The arrangement just described has been found to be so efficient that it may in practice be found desirable to employ the arrangement shown in Figure 3. In this arrangement baffles 5 are arranged on the exhaust side of the space between cylinders 3 and 4 while the cowling 10 is arranged on the intake or other side of the engine over the space between cylinders 3 and 4. Obviously the exhaust side of the cylinder is subjected to the greater degree of heat. However, by either of the arrangements shown in Figures 2 and 3, the efficiency of air cooling of the adjacent cylinder walls is obtained. The matter of preference between the two arrangements lies only in the question of cooling the exhaust side of the cylinders.

The same pressure differential and Venturi effect may be carried out for the front side of the front cylinder and the rear side of the rear cylinder. A restricted air passage and a Venturi effect is provided for the passage of air around the front side of the front cylinder by means of a suitable curved baffle 12, as indicated in Figures 2 and 3, connected to a part of the engine, such as the front oil drain pipe 14. The rear end of the cowling 10 may also be curved at 13 to provide a restricted air leakage passage, pressure differential and a Venturi effect for the air at the rear of the engine and emerging from the side of the cylinders opposite to that on which the cowling 10 is arranged.

I claim:

1. In an internal combustion engine having spaced cylinders provided with lateral cooling fins, an air cooling baffle detachably secured so as to rest upon said fins and to overlap the space between adjacent cylinders, said baffle being curved at both ends and capable of producing a Venturi effect on the air passing between the baffle and both of said adjacent cylinder walls, resilient detachable retaining means for said baffle extending between said cylinders.

2. In an internal combustion engine having spaced cylinders provided with lateral cooling fins, an air cooling baffle detachably secured so as to rest upon said fins and to overlap the space between adjacent cylinders, said baffle being curved and capable of producing a Venturi effect on the air passing between the baffle and the side walls of said adjacent cylinders, retaining means for said baffle including a retaining plate adapted to rest between the cooling fins on the opposite side of said cylinders and a tension element between said baffle and retaining plate.

3. In an internal combustion engine having spaced cylinders each of which is provided with substantially lateral cooling fins, a cowling for said engine arranged on the exhaust side of said cylinders, baffles arranged between the adjacent cylinder walls and resting on said fins, said baffles having their vertical ends curved inwardly and away from said cylinders, so as to provide an air passageway having the characteristics of a venturi to provide a means of accelerating the airflow between said adjacent cylinder walls.

4. In air-cooled engines, a baffling means bearing on the engine cylinders and extending across the inter-cylinder spaces to direct air to the leeward sides of said cylinders, and a member bearing on the opposite sides of said cylinders, and fastened to said baffling means for clamping the complete assembly in position.

5. An internal combustion engine having spaced cylinders and adapted to be located in an air stream, a cowling substantially enclosing one side of said cylinders and having an opening for diverting a portion of the air stream into the cowling, and baffles between the cylinders providing restricted passages adjacent the cylinder walls for the flow of air under pressure from within the cowling to the opposite side of the cylinders.

6. In an internal combustion engine having spaced cylinders each of which is provided with substantially lateral cooling fins, a cowling for said engine arranged so as to direct incoming air on one side of said cylinders for confining air on that side, baffles arranged between the adjacent cylinder walls and resting on said fins to provide a restricted passage between said cylinders, said baffles having their sides predeterminedly curved away from said cylinders, so as to provide an air passageway part of which has the characteristics of a venturi to accelerate the discharge of air as it emerges from one side of said adjacent cylinder walls to the other side thereof.

7. In an internal combustion engine having spaced cylinders each of which is provided with substantially lateral cooling fins, a cowling for said engine arranged on the exhaust side of said cylinders to direct the incoming air to that side for confining air on that side, baffles arranged between the adjacent cylinder walls and resting on said fins to provide a restricted passage between said cylinders, said baffles having their sides predeterminedly curved away from said cylinders, so as to provide an air passageway part of which has the characteristics of a venturi to accelerate the discharge of air as it emerges from one side of said adjacent cylinder walls to the other side thereof.

8. In an internal combustion engine having spaced cylinders each of which is provided with substantially lateral cooling fins, a cowling for said engine arranged on the intake side of said cylinders to direct the incoming air to that side, baffles arranged between the adjacent cylinder walls and resting on said fins to provide a restricted passage between said cylinders, said baffles having their sides predeterminedly curved away from said cylinders, so as to provide an air passageway part of which has the characteristics of a venturi to accelerate the discharge of air as it emerges from one side of said adjacent cylinder walls to the other side thereof.

9. In an aeronautical engine having a plurality of cylinders arranged in a row, the combination of cowling substantially enclosing only one side of the row of cylinders and having an opening directed in the direction of travel of the engine for diverting and confining air within the cowling, and baffles in the intercylinder spaces providing restricted passages adjacent the walls of the corresponding cylinders for the flow of air under differential pressure from within the cowling to the opposite side of the row of cylinders.

10. In an aeronautical engine having a plurality of cylinders arranged in a row, the combination of cowling substantially enclosing only one side of the row of cylinders and having an opening directed in the direction of travel of the engine for diverting and confining air within the cowling, and baffle means bridging the intercylinder spaces and providing restricted passages adjacent the walls of the corresponding cylinders of less total width than the width of the corresponding intercylinder space for the flow of air under differential pressure from within the cowling to the opposite side of the row of cylinders.

11. In an aeronautical engine having a plurality of cylinders arranged in a row, the combination of cowling substantially enclosing only one side of the row of cylinders and having an opening directed in the direction of travel of the engine for diverting and confining air within the cowling, spaced cooling fins on said cylinders, and baffles extending between adjacent cylinders and engaging the fins thereof to provide restricted passages defined jointly by the walls of the cylinders, the adjacent fins and the corresponding edges of the baffles for the flow of air under differential pressure from within the cowling to the opposite side of the row of cylinders.

12. In an aeronautical engine having a plurality of cylinders arranged in a row, the combination of cowling substantially enclosing only one side of the row of cylinders and having an intake opening directed in the direction of travel of the engine for collecting and confining air within the cowling, and baffles substantially closing at least part of the intercylinder spaces and forming with the walls of the cylinders restricted passages for the flow of air from within the cowling to the opposite side of the row of cylinders, the volume of air collected by the cowling being in excess of the volume of air passing through the intercylinder spaces, whereby a differential pressure is established between the opposite sides of the row of cylinders.

WALTER F. DAVIS.